(12) United States Patent
Yamamura (10) Patent No.: US 12,486,407 B2
(45) Date of Patent: Dec. 2, 2025

(54) POWDER COATING MATERIAL

(71) Applicant: SUMITOMO BAKELITE CO., LTD., Tokyo (JP)

(72) Inventor: Hiroshi Yamamura, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 198 days.

(21) Appl. No.: 18/014,669

(22) PCT Filed: Aug. 20, 2020

(86) PCT No.: PCT/JP2020/031411
§ 371 (c)(1),
(2) Date: Jan. 5, 2023

(87) PCT Pub. No.: WO2022/024399
PCT Pub. Date: Feb. 3, 2022

(65) Prior Publication Data
US 2023/0312938 A1    Oct. 5, 2023

(30) Foreign Application Priority Data
Jul. 31, 2020    (JP) .................... 2020-130536

(51) Int. Cl.
*C09D 7/61*    (2018.01)
*C09D 5/03*    (2006.01)
(Continued)

(52) U.S. Cl.
CPC .............. *C09D 5/031* (2013.01); *C09D 5/035* (2013.01); *C09D 7/61* (2018.01); *C09D 7/63* (2018.01);
(Continued)

(58) Field of Classification Search
CPC combination set(s) only.
See application file for complete search history.

(56) References Cited

U.S. PATENT DOCUMENTS 10,407,575 B2    9/2019    Toyoda
11,512,221 B2    11/2022   Saito et al.
(Continued)

FOREIGN PATENT DOCUMENTS

CN    111032799 A    4/2020
JP    9-272820 A     10/1997
(Continued)

OTHER PUBLICATIONS

International Search Report dated Oct. 13, 2020, issued in counterpart International Application No. PCT/JP2020/031411 (2 pages).
(Continued)

*Primary Examiner* — Peter A Salamon
(74) *Attorney, Agent, or Firm* — WHDA, LLP (57) ABSTRACT

A powder coating material used for a powder coating method including a step of immersing a coil end of a coil, which includes a conductor portion coated with an insulating coating and an exposed portion where the conductor portion is exposed from the insulating coating, in a fluidized chamber in which a powder coating material flows, and adhering a melt of the powder coating material to an outside of the exposed portion, the powder coating material containing a particulate thermosetting resin composition. The thermosetting resin composition contains an epoxy resin, and a curing agent.

12 Claims, 1 Drawing Sheet

(51) Int. Cl.
*C09D 7/40* (2018.01)
*C09D 7/63* (2018.01)
*C09D 163/00* (2006.01)

(52) U.S. Cl.
CPC ............... *C09D 7/69* (2018.01); *C09D 7/70* (2018.01); *C09D 163/00* (2013.01)

(56) References Cited

U.S. PATENT DOCUMENTS

| | | | | |
|---|---|---|---|---|
| 2003/0104181 | A1* | 6/2003 | Grenda | C08F 293/005 |
| | | | | 427/180 |
| 2003/0191218 | A1* | 10/2003 | Guilbert | C09D 163/00 |
| | | | | 524/323 |
| 2005/0037207 | A1* | 2/2005 | Komiyama | C09D 171/02 |
| | | | | 523/400 |
| 2006/0102871 | A1* | 5/2006 | Wang | B82Y 25/00 |
| | | | | 252/62.51 R |
| 2006/0249705 | A1* | 11/2006 | Wang | C04B 35/2683 |
| | | | | 501/141 |
| 2010/0227090 | A1* | 9/2010 | Liao | C08G 18/2845 |
| | | | | 428/35.8 |
| 2012/0258316 | A1* | 10/2012 | Lucas | B32B 15/092 |
| | | | | 523/400 |
| 2013/0251931 | A1* | 9/2013 | Liao | C09D 163/00 |
| | | | | 523/400 |
| 2015/0225576 | A1* | 8/2015 | Aguirre Vargas | C08G 59/26 |
| | | | | 525/65 |
| 2015/0240113 | A1* | 8/2015 | Pratt | C09D 163/00 |
| | | | | 523/400 |
| 2016/0257845 | A1* | 9/2016 | Park | F16F 1/024 |
| 2017/0096521 | A1* | 4/2017 | Niederst | C08G 59/686 |
| 2018/0079911 | A1* | 3/2018 | Toyoda | C09D 5/032 |
| 2019/0077047 | A1* | 3/2019 | Andrews | C09D 5/035 |
| 2019/0241764 | A1* | 8/2019 | Niederst | B05D 7/227 |
| 2020/0102459 | A1* | 4/2020 | Sista | C09D 7/63 |
| 2020/0165482 | A1* | 5/2020 | Saito | H01B 3/40 |

FOREIGN PATENT DOCUMENTS

| | | |
|---|---|---|
| JP | 11-104481 A | 4/1999 |
| JP | 2002-105390 A | 4/2002 |
| JP | 2002-348528 A | 12/2002 |
| JP | 2013-203764 A | 10/2013 |
| JP | 2018-48314 A | 3/2018 |
| JP | 2019-104829 A | 6/2019 |
| JP | 2019-172804 A | 10/2019 |

OTHER PUBLICATIONS

Extended (Supplementary) European Search Report dated Jul. 12, 2024, issued in counterpart application No. 20946733.1. (10 pages).

* cited by examiner

POWDER COATING MATERIAL

TECHNICAL FIELD

The present invention relates to a powder coating material.

BACKGROUND ART

Patent Documents 1 to 3 disclose techniques related to powder coating materials containing an epoxy resin.

Patent Document 1 (Japanese Unexamined Patent Publication No. H09-272820) discloses a technique relating to an epoxy resin-based powder coating material containing a lubricant. In this document, it is disclosed that, by using a powder coating material containing a lubricant, especially a powder coating material surface-treated with a lubricant, a uniform matte coating film with excellent fluidity and no surface roughness of a coating film is obtained.

Patent Document 2 (Japanese Unexamined Patent Publication No. H11-104481) discloses, as a technique for providing a fluidity modifier for thermosetting powder coating material, which improves both free-flow properties and melt-flow properties, and a method for improving fluidity of the thermosetting powder coating material, a fluidity modifier for thermosetting powder coating material, which consists of a crystalline epoxy resin having a specific average particle diameter and melting point and spherical fine particles having a specific average particle diameter, in which a weight ratio thereof is within a specific range.

Patent Document 3 (Japanese Unexamined Patent Publication No. 2018-48314) discloses an epoxy resin powder coating material containing which contains a bisphenol A-type epoxy resin, spherical inorganic particles having an average particle diameter of 16 to 50 μm, acryl-based core shell type particles as essential components, and discloses that, with the epoxy resin powder coating material, it is possible to form a coating film with excellent heat cycle resistance even on a metal part in the recent years (metal part that has a structure in which multiple types of metals with different materials are combined in a complex manner and that requires high standard performance), without imparting workability and coating properties during coating.

RELATED DOCUMENT

Patent Documents

Patent Document 1: Japanese Unexamined Patent Publication No. H09-272820
Patent Document 2: Japanese Unexamined Patent Publication No. H11-104481
Patent Document 3: Japanese Unexamined Patent Publication No. 2018-48314

SUMMARY OF THE INVENTION

Technical Problem

However, in a case where the present inventor has studied on the techniques disclosed in the above documents, it has been found that there is room for improvement in terms of providing a powder coating material for coating coil ends, with excellent storage stability.

Solution to Problem

According to the present invention, there is provided a powder coating material that is used for a powder coating method including a step of immersing a coil end of a coil, which includes a conductor portion coated with an insulating coating and an exposed portion where the conductor portion is exposed from the insulating coating, in a fluidized chamber in which a powder coating material flows, and adhering a melt of the powder coating material to an outside of the exposed portion, the powder coating material containing a particulate thermosetting resin composition, in which the thermosetting resin composition contains an epoxy resin, a curing agent, and an inorganic filler, a particle diameter $d_{90}$ of the thermosetting resin composition, which is measured by a laser diffraction method, is equal to or more than 55 μm and equal to or less than 200 μm, a flow-rate change index R of the powder coating material, which is measured according to the following procedure 1, is equal to or more than 0% and equal to or less than 26%, and a flow rate X(0) of the powder coating material before storage, which is measured according to the procedure 1, is equal to or more than 15% and equal to or less than 60%.

(Procedure 1)

the powder coating material is stored at 40° C. for 15 days, and flow rates before and after the storage and the flow-rate change index R are calculated by the following method.

(Measuring Method of Flow Rate)

(1) 0.5 g of the powder coating material is placed in a 10 mmφ molding die, and pressure-molded at 20 kgf for 10 seconds to produce a cylindrical sample.

(2) after measuring a diameter D0 of the sample, the sample is placed on a 70 mm×150 mm×0.8 mm SPCC plate, and allowed to stand in a hot air dryer at 150° C. for 30 minutes.

(3) a diameter D1 at a contact surface of the sample with the SPCC plate after the allowing to stand is measured.

(4) D0 and D1 described above are measured before storage (t=0 days) and after storage at 40° C. for 15 days (t=15 days), and the flow rate X(0) of the sample before the storage and a flow rate X(15) of the sample after the storage for 15 days are calculated based on the following expression (i).

$$X(t)(\%) = (D1 - D0)/D0 * 100 \quad (i)$$

(5) the flow-rate change index R is calculated based on the following expression (ii).

$$R = X(0) - X(15) \quad (ii)$$

According to the present invention, there is provided a powder coating material that is used for a powder coating method including a step of immersing a coil end of a coil, which includes a conductor portion coated with an insulating coating and an exposed portion where the conductor portion is exposed from the insulating coating, in a fluidized chamber in which a powder coating material flows, and adhering a melt of the powder coating material to an outside of the exposed portion, the powder coating material containing a particulate thermosetting resin composition, in which the thermosetting resin composition contains an epoxy resin, a curing agent, and an inorganic filler, a particle diameter $d_{50}$ of the thermosetting resin composition, which is measured by a laser diffraction method, is equal to or more than 55 μm and equal to or less than 200 μm, a flow rate X(15) of the powder coating material after storage for 15 days, which is measured according to the following procedure 2, is equal to or more than 15% and equal to or less than 60%, and a flow rate X(0) of the powder coating material before storage, which is measured according to the procedure 2, is equal to or more than 15% and equal to or less than 60%.
(Procedure 2)
the powder coating material is stored at 40° C. for 15 days, and flow rates before and after the storage are calculated by the following method.
(Measuring Method of Flow Rate)
(1) 0.5 g of the powder coating material is placed in a 10 mmo molding die, and pressure-molded at 20 kgf for 10 seconds to produce a cylindrical sample.
(2) after measuring a diameter D0 of the sample, the sample is placed on a 70 mm×150 mm×0.8 mm SPCC plate, and allowed to stand in a hot air dryer at 150° C. for 30 minutes.
(3) a diameter D1 at a contact surface of the sample with the SPCC plate after the allowing to stand is measured.
(4) D0 and D1 described above are measured before storage (t=0 days) and after storage at 40° C. for 15 days (t=15 days), and the flow rate X(0) of the sample before the storage and a flow rate X(15) of the sample after the storage for 15 days are calculated based on the following expression (i).

$$X(t)(\%)=(D1-D0)/D0\times 100 \quad (i)$$

According to the present invention, there is provided a coil including the coil end in which the exposed portion is sealed with the above-described powder coating material according to the present invention.

According to the present invention, there is provided a method for sealing a coil end, including a step of immersing a coil end of a coil, which includes a conductor portion coated with an insulating coating and an exposed portion where the conductor portion is exposed from the insulating coating, in a fluidized chamber in which a powder coating material flows, and adhering a melt of the powder coating material to an outside of the exposed portion, in which the powder coating material is the above-described powder coating material according to the present invention.

Any combination of each of these configurations, or any transformation of the expression of the present invention between methods, devices, and the like, is also valid as an aspect of the present invention.

For example, according to the present invention, an article which is coated by the powder coating material according to the present invention can also be obtained.

Advantageous Effects of Invention

According to the present invention, it is possible to provide a powder coating material for coating a coil end, which is excellent in storage stability.

DESCRIPTION OF EMBODIMENTS

Hereinafter, embodiments will be described. In the present embodiments, a composition may include each component alone or in combination of two or more kinds.
(Powder Coating Material)
In the present embodiment, the powder coating material is a powder coating material which is used for a powder coating method including a step of immersing a coil end of a coil, which includes a conductor portion coated with an insulating coating and an exposed portion where the conductor portion is exposed from the insulating coating, in a fluidized chamber in which a powder coating material flows, and adhering a melt of the powder coating material to an outside of the exposed portion, and the powder coating material contains a particulate thermosetting resin composition. The thermosetting resin composition contains an epoxy resin, a curing agent, and an inorganic filler, in which a particle diameter dy of the thermosetting resin composition, which is measured by a laser diffraction method, is equal to or more than 55 μm and equal to or less than 200 μm. The powder coating material may be composed of the particulate thermosetting resin composition, or may contain other components. The powder coating material has either one or both of configurations according to the following aspects 1 and 2 in terms of flow rate after storage.
(Aspect 1)
A flow-rate change index R of the powder coating material, which is measured according to the following procedure 1, is equal to or more than 0% and equal to or less than 26%, and a flow rate X(0) of the powder coating material before storage is equal to or more than 15% and equal to or less than 60%.
(Procedure 1)
The powder coating material is stored at 40° C. for 15 days, and flow rates before and after the storage and the flow-rate change index R are calculated by the following method.
(Measuring Method of Flow Rate)
(1) 0.5 g of the powder coating material is placed in a 10 mmo molding die, and pressure-molded at 20 kgf for 10 seconds to produce a cylindrical sample.
(2) After measuring a diameter D0 of the sample, the sample is placed on a 70 mm×150 mm×0.8 mm SPCC plate, and allowed to stand in a hot air dryer at 150° C. for 30 minutes.
(3) A diameter D1 at a contact surface of the sample with the SPCC plate after the allowing to stand is measured.
(4) D0 and D1 described above are measured before storage (t=0 days) and after storage at 40° C. for 15 days (t=15 days), and the flow rate X(0) of the sample before the storage and a flow rate X(15) of the sample after the storage for 15 days are calculated based on the following expression (i).

$$X(t)(\%)=(D1-D0)/D0\times 100 \quad (i)$$

(5) The flow-rate change index R is calculated based on the following expression (ii).

$$R=X(0)-X(15) \quad (ii)$$

(Aspect 2)
A flow rate X(15) of the powder coating material after storage for 15 days, which is measured according to the following procedure 2, is equal to or more than 15% and equal to or less than 60%, and a flow rate X(0) of the powder coating material before storage is equal to or more than 15% and equal to or less than 60%.
(Procedure 2)
The powder coating material is stored at 40° C. for 15 days, and flow rates before and after the storage are calculated by the following method.
(Measuring Method of Flow Rate)
(1) 0.5 g of the powder coating material is placed in a 10 mmφ molding die, and pressure-molded at 20 kgf for 10 seconds to produce a cylindrical sample.

(2) After measuring a diameter D0 of the sample, the sample is placed on a 70 mm×150 mm×0.8 mm SPCC plate, and allowed to stand in a hot air dryer at 150° C. for 30 minutes.

(3) A diameter D1 at a contact surface of the sample with the SPCC plate after the allowing to stand is measured.

(4) D0 and D1 described above are measured before storage (t=0 days) and after storage at 40° C. for 15 days (t=15 days), and the flow rate X(0) of the sample before the storage and a flow rate X(15) of the sample after the storage for 15 days (t=15 days) are calculated based on the following expression (i).

$$X(t)(\%)=(D1-D0)/D0\times 100 \quad (1)$$

In the present embodiments, since the particulate thermosetting resin composition contained in the powder coating material contains a specific component and exhibits specific particle size characteristics, and the powder coating material has at least one configuration of the aspect 1 or the aspect 2 in terms of flow rate after storage, a powder coating material suitable for coating coil ends and having excellent storage stability can be obtained. In addition, according to the present embodiments, for example, it is possible to provide a powder coating material which is excellent in storage stability and also has preferred reactivity.

The present inventor has focused and studied on flowing behavior and melting behavior of the powder coating material in a fluidized chamber as a design guide for powder coating materials which can stably coat coil ends by powder coating. As a result, in the powder coating material, by controlling the flow rate X(0) of the sample before storage and at least one of the flow-rate change index R or the flow rate X(15) after storage for 15 days as an index, while controlling components and particle size characteristics of the thermosetting resin composition contained in the powder coating material, it has been newly found that the coating of the coil ends can be stably performed. The reason for this is not necessarily clear, but by controlling the flow rate of the powder coating material having the above-described configuration or the rate of change thereof, the coil ends can be immersed in the fluidized chamber in a state in which the powder coating material flows preferably in the fluidized chamber. Furthermore, since the change in physical properties of the powder is small, it is considered that the coating can be applied with a stable film thickness by suppressing variations in conditions, and the powder coating material can be spread stably over the entire region of the coil ends to be coated in a case where the adhered powder coating material melts. As a result, it is considered that, for example, occurrence of coating unevenness or voids in a case where the coil ends are coated with the powder coating material can be suitably suppressed.

The powder coating material according to the present embodiment is preferably used in the powder coating method for adhering the melt from the exposed portion of the coil end over the insulating coating, in the step of adhering the melt of the powder coating material to the outside of the exposed portion. More specifically, the powder coating material according to the present embodiment can stably seal a connection portion, a welded portion, and the like of the conductor in the exposed portion, and as a result, for example, it is possible to improve strength of the connection portion and the welded portion.

Hereinafter, the configuration of the powder coating material will be described more specifically.

From the viewpoint of improving coating properties of the powder coating material to the coil end with fluidity of the powder coating material in the fluidized chamber being preferable, the flow rate X(0) of the powder coating material before storage (t=0 days) is, for example, equal to or more than 15%, preferably equal to or more than 20%, more preferably equal to or more than 25%, still more preferably equal to or more than 308, and even more preferably equal to or more than 35%.

In addition, from the viewpoint suppressing sagging of the coating film, the flow rate X(0) is preferably equal to or less than 60%, more preferably equal to or less than 55%, still more preferably equal to or less than 50%, even more preferably equal to or less than 45%, and even still more preferably equal to or less than 41%.

In the powder coating material, from the viewpoint of having few voids and good coating film appearance, the flow rate X(15) after storage at 40° C. for 15 days (t=15 days) is preferably equal to or more than 15%, more preferably equal to or more than 188, and still more preferably equal to or more than 20%.

In addition, from the viewpoint suppressing sagging of the coating film, the flow rate X(15) is preferably equal to or less than 60%, more preferably equal to or less than 55%, still more preferably equal to or less than 50%, even more preferably equal to or less than 45%, even still more preferably equal to or less than 34%, and further more preferably equal to or less than 30%.

In addition, from the viewpoint of suppressing variation in thickness and appearance of the formed coating film, the flow-rate change index R of the powder coating material before and after the storage is specifically equal to or less than 45%, preferably equal to or less than 26%, more preferably equal to or less than 25%, still more preferably equal to or less than 24%, and even more preferably equal to or less than 22%.

In addition, the flow-rate change index R is, for example, equal to or more than 0%, more specifically 0% or more than 0%.

The flow rates before and after the storage and the flow-rate change index R are measured by the procedure 1 or 2 described above, and more specifically measured by the following procedure. First, the flow rate of the powder coating material before storage (t=0 days) is measured by the following procedure. That is, 0.5 g of the powder coating material is placed in a 10 mmo molding die, and pressure-molded at 20 kgf for 10 seconds to produce a cylindrical sample, and a diameter D0 of the obtained sample is measured.

Next, the sample is placed on a 70 mm×150 mm×0.8 mm SPCC plate, and allowed to stand in a hot air dryer at 150° C. for 30 minutes. A diameter D1 at a contact surface of the sample with the SPCC plate after the allowing to stand is measured.

The flow rate X(0) before storage is calculated based on the following expression (i).

$$X(t)(\%)=(D1-D0)/D0\times 100 \quad (1)$$

With regard to the flow rate after storage (t=15 days), first, the powder coating material is stored at 40° C. for 15 days. Specifically, the powder coating material which has not been subjected to the above-described molding step is stored. After the storage, production of a sample of the powder coating material after the storage, measurement of D0, standing at 150° C. for 30 minutes, and measurement of D1 are performed according to the procedure for measuring the flow rate of the powder coating material before storage (t=0). The flow rate X(15) after the storage is calculated based on the above expression (i).

The flow-rate change index R before and after the storage is calculated based on the following expression (ii) from the obtained flow rate X(0) and flow rate X(15).

$$R=X(0)-X(15) \quad \text{(ii)}$$

Next, the particle size characteristics of the thermosetting resin composition in the powder coating material will be described. From the viewpoint of allowing the powder coating material to preferably flow in the fluidized chamber during coating the coil end, the particle diameter $d_{90}$ of the thermosetting resin composition is, for example, equal to or more than 55 μm, preferably equal to or more than 70 μm, more preferably equal to or more than 90 μm, still more preferably equal to or more than 100 μm, even more preferably equal to or more than 110 μm, and even still more preferably equal to or more than 120 μm.

In addition, from the viewpoint of preventing coarse powder from accumulating on a bottom of the fluidized chamber and coating more stably, the particle diameter $d_{90}$ of the thermosetting resin composition is, for example, equal to or less than 200 μm, preferably equal to or less than 145 μm, more preferably equal to or less than 140 μm, and still more preferably equal to or less than 135 μm.

Here, the particle diameter de of the thermosetting resin composition, other particle size characteristics, and particle size characteristics of the inorganic particles described later can be obtained by a laser diffraction method, specifically by measuring a particle size distribution of particles on a volume basis using a commercially available laser diffraction particle size distribution analyzer (for example, SALD-7000 manufactured by Shimadzu Corporation).

From the viewpoint of securing the film thickness of the coating film formed of the powder coating material and suppressing aggregation, a particle diameter dy of the thermosetting resin composition is preferably equal to or more than 5 μm, more preferably equal to or more than 15 μm, still more preferably equal to or more than 20 μm, and even more preferably equal to or more than 25 μm.

In addition, from the viewpoint of reducing production cost, the particle diameter die of the thermosetting resin composition is preferably equal to or less than 50 μm, more preferably equal to or less than 45 μm, still more preferably equal to or less than 40 μm, and even more preferably equal to or less than 35 μm.

In addition, for example, properties of the powder coating material as a powder can be set as follows.

From the viewpoint of melt adhesion of the powder coating material during coating the coil end, an angle of repose of the powder coating material is preferably equal to or more than 25°, more preferably equal to or more than 28', and still more preferably equal to or more than 30°.

In addition, from the viewpoint of allowing the powder coating material to preferably flow in the fluidized chamber during coating the coil end, the angle of repose of the powder coating material is preferably equal to or less than 45°, more preferably equal to or less than 40°, and still more preferably equal to or less than 38°.

From the viewpoint of melt adhesion of the powder coating material during coating the coil end, an angle of rupture of the powder coating material is preferably equal to or more than 10°, more preferably equal to or more than 11°, and still more preferably equal to or more than 12°.

In addition, from the viewpoint of allowing the powder coating material to preferably flow in the fluidized chamber during coating the coil end, the angle of rupture of the powder coating material is preferably equal to or less than 25°, more preferably equal to or less than 20°, and still more preferably equal to or less than 15°.

Here, the angle of rupture and the angle of repose are measured specifically by a device such as a powder tester (for example, manufactured by Hosokawa Micron Group).

From the viewpoint of low linear expansion, a true specific gravity of the powder coating material is preferably equal to or more than 1.0 g/cm$^3$, more preferably equal to or more than 1.2 g/cm$^3$, and still more preferably equal to or more than 1.5 g/cm$^3$.

In addition, from the viewpoint of making the coating film appearance more preferable, the true specific gravity of the powder coating material is preferably equal to or less than 3.0 g/cm$^3$, more preferably equal to or less than 2.5 g/cm$^3$, and still more preferably equal to or less than 2.0 g/cm$^3$.

Here, the true specific gravity of the powder coating material is measured specifically by a dry automatic density meter.

From the viewpoint of stabilizing the flow in the fluidized chamber, a bulk specific gravity of the powder coating material is preferably equal to or more than 0.3 g/cm$^3$, more preferably equal to or more than 0.5 g/cm$^3$, and still more preferably equal to or more than 0.6 g/cm$^3$.

In addition, from the viewpoint of increasing the fluidity of the powder coating material, the bulk specific gravity of the powder coating material is preferably equal to or less than 1.5 g/cm$^3$, more preferably equal to or less than 1.2 g/cm$^3$, and still more preferably equal to or less than 1.0 g/cm$^3$.

Here, the bulk specific gravity of the powder coating material is measured specifically by a powder tester (manufactured by Hosokawa Micron Group).

From the viewpoint of forming a coating more stably during powder coating of the coil end, a ratio (bulk specific gravity/true specific gravity) of the bulk specific gravity of the powder coating material to the true specific gravity of the powder coating material is preferably equal to or more than 0.3, more preferably equal to or more than 0.35, and still more preferably equal to or more than 0.4; and the ratio is preferably equal to or less than 0.7, more preferably equal to or less than 0.6, and still more preferably equal to or less than 0.5.

In addition, from the viewpoint of improving the storage stability of the powder coating material, it is preferable that, in a case where 1.5 kg of the powder coating material is stored at 40° C. and then 0.7 kg thereof is subdivided, the subdivided powder can be loosened by hand.

Constituent components of the powder coating material will be described.

The powder coating material contains the thermosetting resin composition, and the thermosetting resin composition contains an epoxy resin, a curing agent, and an inorganic filler.

Specific examples of the epoxy resin include an epoxy resin which has two or more epoxy groups in the molecule and is solid at room temperature. Examples of such an epoxy resin include epoxy resins such as a bisphenol A-type epoxy resin, a bisphenol F-type epoxy resin, a bisphenol S-type epoxy resin, a novolac-type epoxy resin, a phenol novolac-type epoxy resin, a cresol novolac-type epoxy resin, a biphenyl-type epoxy resin, a naphthalene-type epoxy resin, a biphenyl aralkyl-type epoxy resin, and an aromatic amine-type epoxy resin.

From the viewpoint of more stably coating the coil end, the epoxy resin preferably includes one kind or two or more kinds selected from the group consisting of a bisphenol A-type epoxy resin, a bisphenol F-type epoxy resin, a novolac-type epoxy resin, a phenol novolac-type epoxy resin, a biphenyl-type epoxy resin, a naphthalene-type epoxy resin, and a biphenyl aralkyl-type epoxy resin, and more preferably includes at least one kind selected from the group consisting of a bisphenol A-type epoxy resin and a biphenyl aralkyl-type epoxy resin.

From the viewpoint of improving smoothness of a surface of a cured product of the powder coating material, a content of the epoxy resin in the thermosetting resin composition is preferably equal to or more than 20% by mass, more preferably equal to or more than 25% by mass, and still more preferably equal to or more than 30% by mass with respect to the entire thermosetting resin composition.

In addition, from the viewpoint of improving coating moldability of the powder coating material, the content of the epoxy resin in the thermosetting resin composition is preferably equal to or less than 95% by mass, more preferably equal to or less than 90% by mass, still more preferably equal to or less than 80% by mass, and even more preferably equal to or less than 60% by mass with respect to the entire thermosetting resin composition.

In addition, the thermosetting resin composition may contain other thermosetting resins. Examples of the other thermosetting resins include one kind or two or more kinds selected from the group consisting of a phenolic resin, a melamine resin, an unsaturated polyester resin, and a polyurethane resin.

In addition, the thermosetting resin may also include a resin curing agent such as a phenolic resin curing agent, which will be described later.

From the viewpoint of improving smoothness of a surface of a cured product of the powder coating material, a content of the thermosetting resin in the thermosetting resin composition is preferably equal to or more than 20% by mass, more preferably equal to or more than 25% by mass, and still more preferably equal to or more than 30% by mass with respect to the entire thermosetting resin composition.

In addition, from the viewpoint of improving coating moldability of the powder coating material, the content of the thermosetting resin in the thermosetting resin composition is preferably equal to or less than 95% by mass, more preferably equal to or less than 90% by mass, still more preferably equal to or less than 80% by mass, and even more preferably equal to or less than 60% by mass with respect to the entire thermosetting resin composition.

Specific examples of the curing agent include amines such as aromatic amines, for example, diaminodiphenylmethane, an aniline resin, and the like, condensates of an aliphatic amine and an aliphatic dicarboxylic acid, dicyandiamide, and derivatives thereof;

various imidazole and imidazoline compounds;
polydicarboxylic acids such as adipic acid, sebacic acid, phthalic acid, maleic acid, trimellitic acid, benzophenonedicarboxylic acid, and pyromellitic acid or acid anhydrides thereof;
phenolic resins such as a biphenyl aralkyl-type phenolic resin and a naphthol aralkyl-type phenolic resin;
novolacs such as dihydrazides such as adipic acid and phthalic acid, and condensates of a compound such as phenol, cresol, xylenol, and bisphenol A and an aldehyde;
carboxylic acid amide;
methylolated melamines; and
blocked isocyanurates.

From the viewpoint of improving adhesiveness, heat resistance, heat cycle resistance, and curability of the obtained powder coating material, the curing agent preferably includes one or more kinds selected from the group consisting of an acid anhydride and a phenolic resin.

A proportion of the curing agent to the epoxy resin can be adjusted, for example, by the type of the epoxy resin and the type of the curing agent used.

From the viewpoint of obtaining good curability and cured product properties, the proportion of the curing agent to the epoxy resin is that the functional group (number) of the curing agent with respect to the epoxy group (number) of the epoxy resin is preferably equal to or more than 0.3 molar equivalent, more preferably equal to or more than 0.5 molar equivalent, and still more preferably equal to or more than 0.6 molar equivalent, and is preferably equal to or less than 1.2 molar equivalent, more preferably equal to or less than 1.1 molar equivalent, and still more preferably equal to or less than 0.9 molar equivalent.

Specific examples of the inorganic filler include silica such as crystalline silica, fused silica such as fused crushed silica, spherical silica, and surface-treated silica; calcium compounds such as calcium carbonate and calcium sulfate; barium sulfate, aluminum oxide (specifically, alumina), aluminum hydroxide, magnesium hydroxide, talc, kaolin, clay, mica, dolomite, wollastonite, glass fiber, glass beads, zircon, and a molybdenum compound.

From the viewpoint of availability, the inorganic filler preferably includes one kind or two or more kinds selected from the group consisting of silica, alumina, and calcium carbonate, and is more preferably one kind or two or more kinds selected from the group consisting of silica, alumina, and calcium carbonate.

From the viewpoint of improving mechanical strength of the thermosetting resin composition, a content of the inorganic filler in the thermosetting resin composition is preferably equal to or more than 20% by mass, more preferably equal to or more than 30% by mass, and still more preferably equal to or more than 40% by mass with respect to the entire thermosetting resin composition. In addition, from the viewpoint of improving smoothness of a cured product of the thermosetting resin composition, the content of the inorganic filler in the thermosetting resin composition is preferably equal to or less than 75% by mass and more preferably equal to or less than 65% by mass with respect to the entire thermosetting resin composition.

The thermosetting resin composition may contain a component other than the above-described components. For example, the thermosetting resin composition may contain a curing accelerator, a coloring agent, a leveling material, a flame retardant, a coupling agent, and the like.

Specific examples of the curing accelerator include organic phosphines such as triphenylphosphine; imidazole compounds such as 2-phenylimidazole; and amine compounds such as tertiary amine.

From the viewpoint of obtaining good curing properties, with respect to the entire thermosetting resin composition, a content of the curing accelerator in the thermosetting resin composition is preferably equal to or more than 0.05% by mass, more preferably equal to or more than 0.01% by mass, and still more preferably equal to or more than 0.02% by mass, and is preferably equal to or less than 2% by mass, more preferably equal to or less than 1% by mass, still more preferably equal to or less than 0.5% by mass, even more preferably equal to or less than 0.2% by mass, and even still more preferably equal to or less than 0.18 by mass.

The thermosetting resin composition may further contain a coloring agent such as a pigment.

Specific examples of the pigment include one kind or two or more kinds selected from the group consisting of titanium oxide, iron oxide, zinc oxide, carbon black, and cyanine blue.

From the viewpoint of obtaining preferred coloring properties, with respect to the entire powder coating material, a content of the pigment in the powder coating material is preferably equal to or more than 0.01% by mass, more preferably equal to or more than 0.05% by mass, and still more preferably equal to or more than 0.18 by mass, and is preferably equal to or less than 5% by mass, more preferably equal to or less than 3% by mass, still more preferably equal to or less than 2% by mass, and even more preferably equal to or less than 1% by mass.

Specific examples of the leveling material include an acrylic oligomer.

From the viewpoint of improving smoothness of the coating film, with respect to the entire powder coating material, a content of the pigment in the powder coating material is preferably equal to or more than 0.01% by mass, more preferably equal to or more than 0.05% by mass, and still more preferably equal to or more than 0.1% by mass, and is preferably equal to or less than 28 by mass, more preferably equal to or less than 1% by mass, and still more preferably equal to or less than 0.5% by mass.

In addition, the powder coating material may contain a component other than the particulate thermosetting resin composition. Specific examples of such a component include a fluidity imparting material. Specific examples of the fluidity imparting material include inorganic particles. That is, from the viewpoint of further improving the fluidity, the powder coating material preferably further contains inorganic particles as the component other than the particulate thermosetting resin composition.

A material of the inorganic particles is preferably one or more kinds selected from the group consisting of alumina and silica, and more preferably alumina.

From the viewpoint improving the fluidity of the powder coating material, an average particle diameter $d_{50}$ of the inorganic particles, measured by the laser diffraction method, is preferably equal to or more than 1 nm, more preferably equal to or more than 5 nm, and still more preferably equal to or more than 10 nm, and is preferably equal to or less than 100 nm, more preferably equal to or less than 50 nm, and still more preferably equal to or less than 20 nm.

With respect to the entire powder coating material, a content of the inorganic particles in the powder coating material is preferably equal to or more than 0.01% by mass, more preferably equal to or more than 0.05% by mass, and still more preferably equal to or more than 0.10% by mass, and may be, for example, equal to or less than 5% by mass, preferably equal to or less than 3.0% by mass and more preferably equal to or less than 1.0% by mass.

In addition, from the viewpoint of making the fluidity of the powder coating material more preferable, it is also preferable that the average particle diameter des of the inorganic particles, measured by the laser diffraction method, is equal to or more than 1 nm and equal to or less than 100 nm, and the content of the inorganic particles in the powder coating material is equal to or more than 0.01% by mass and equal to or less than 3.0% by mass with respect to the entire powder coating material.

Next, a method for producing the powder coating material will be described. The method for producing the powder coating material specifically includes a step of preparing the thermosetting resin composition. In addition, in a case where the powder coating material contains a component (for example, the inorganic particles) other than the thermosetting resin composition, the method for producing the powder coating material may further include a step of mixing the thermosetting resin composition with other components.

Here, in order to obtain the powder coating material in which at least one of the particle diameter de of the thermosetting resin composition, the flow rate $X(0)$ before storage, the flow-rate change index R of the powder coating material, or the flow rate $X(15)$ before storage for 15 days is within the specific range, for example, it is important to appropriately select the composition of the thermosetting resin composition and the composition of the powder coating material, and to appropriately select the production process of the thermosetting resin composition.

Here, as the production method of the thermosetting resin composition, for example, the epoxy resin, the inorganic filler, the curing agent, and optional components are all mixed, and then the mixture is melt-kneaded while being heated to obtain a kneaded product of all raw materials. Next, the obtained kneaded product of all raw materials is pulverized with an impact pulverizer, and fine particles and coarse particles are cut by sieving to obtain an epoxy resin powder coating material.

(Coil)

The coil has a coil end in which an exposed portion is sealed with the powder coating material according to the present embodiment. Specific examples of the coil include a motor coil such as a drive motor coil. Hereinafter, a more specific description will be given by taking a stator coil of a motor as an example.

Figure 1:
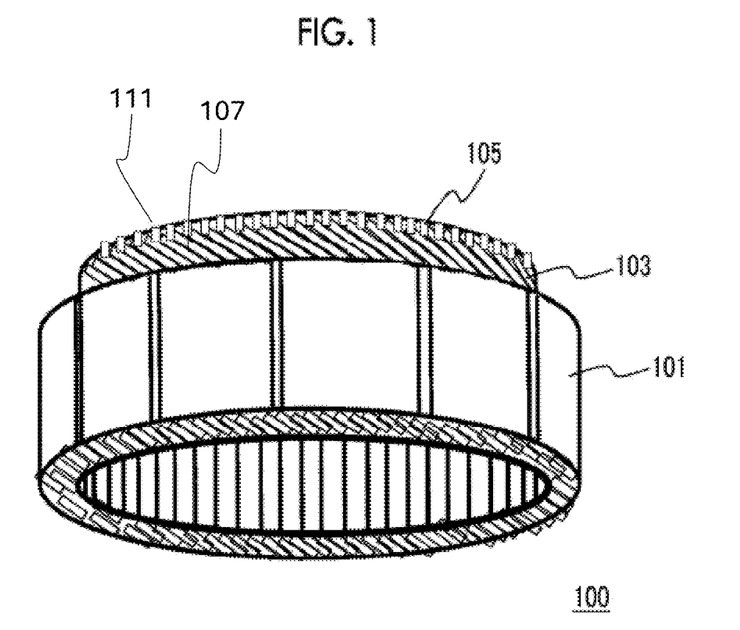
FIG. 1 A perspective view showing a configuration example of a stator in an embodiment.

FIG. 1 is a perspective view showing a configuration example of a stator in an embodiment. A stator 100 shown in FIG. 1 has a stator core 101 and a stator coil 103. The stator coil 103 is disposed in a groove (slot, not shown) provided in an inner wall of the stator core 101.

Figure 2:
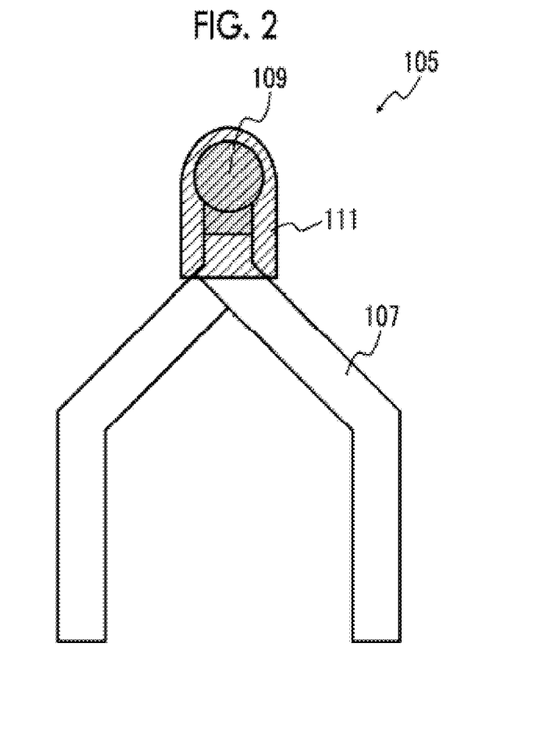
FIG. 2 A top view showing a configuration example of a coil end of a stator coil in the stator shown in FIG. 1.

FIG. 2 is a top view showing a configuration example of a coil end 105 in the stator coil 103. The coil end 105 is provided with an enamel-coated portion 107 in which the conductor portion is coated with an insulating coating such as enamel, and an exposed portion 109 in which the conductor portion is exposed from the enamel coating, and the exposed portion 109 is sealed with the powder coating material according to the present embodiment. In FIG. 2, a coated portion 111 is provided from the exposed portion 109 over the enamel-coated portion 107. The coated portion 111 is composed of a cured product of the powder coating material according to the present embodiment.

(Powder Coating Method)

The powder coating method is, for example, a method of sealing the coil end using the powder coating material according to the present embodiment. Specifically, such a method includes a step (step 1) of immersing the coil end 105 of the coil (stator coil 103), which includes the conductor portion coated with an insulating coating and the exposed portion 109 where the conductor portion is exposed from the insulating coating, in a fluidized chamber in which the powder coating material flows, and adhering a melt of the powder coating material to an outside of the exposed portion.

The step 1 may include, for example, a step (step 1-1) of fluidizing the powder coating material by introducing air into the fluidized chamber storing the powder coating material, and a step (step 1-2) of immersing the coil end 105 in the fluidized chamber in which the powder coating material flows.

In the step 1-1, for example, by filling the top of a perforated plate with the powder coating material using a fluidized chamber provided with the perforated plate at the bottom and introducing air from the outside of the perforated plate, the air can be introduced into the fluidized chamber through the perforated plate.

In the step 1-2, the immersion of the coil end 105 in the fluidized chamber and the adhesion of the melt of the powder coating material to the outside of the exposed portion may be performed as a single step or stepwise, but from the viewpoint of improving sealing stability of the exposed portion 109, it is preferably performed as a single step. That is, the adhesion of the melt of the powder coating material to the outside of the exposed portion is preferably performed while the coil end 105 is immersed in the fluidized chamber.

From the viewpoint of improving the sealing stability of the exposed portion 109, it is preferable that the powder coating method further includes a step of heating the coil end 105 before the coil end 105 is immersed in the fluidized chamber. In this case, by immersing the heated coil end 105 in the fluidized chamber in which the powder coating material flows, the powder coating material in the vicinity of the coil end 105 adheres to the coil end 105 as a melt in the fluidized chamber. In addition, from the viewpoint of more stably melting the powder coating material adhering to the coil end 105, after the coil end 105 is taken out of the fluidized chamber, the coil end 105 may be heated.

The coil end 105 can be heated, for example, by a heater disposed above the fluidized chamber.

In the present embodiment, the powder coating method may further include a step (step 2) of, after the step of adhering the melt of the powder coating material to the outside of the exposed portion 109, heating the coil end 105 to cure the powder coating material. The heat curing conditions can be appropriately set according to the type and size of the coil end 105, the constituent components of the powder coating material, and the like.

In addition, in the powder coating method, from the viewpoint of increasing a thickness of the coating, the step 1 and the step 2 may be alternately repeated multiple times.

In the present embodiment, by using a powder coating which contains a thermosetting resin composition having a specific component and particle size characteristics and has specific properties in terms of flow rate, the coated portion 111 can be formed by stably sealing the coil end 105.

The embodiments of the present invention have been described above, but these are examples of the present invention and various configurations other than the above can be adopted.

EXAMPLES

Examples 1 to 6 and Comparative Examples 1 to 6

In these examples, powder coating materials are produced and evaluated. Components used in the powder coating material are shown below.
(Raw Material of Thermosetting Resin Composition)
(Epoxy Resin)
 Epoxy resin 1: bisphenol A-type epoxy resin, manufactured by Mitsubishi Chemical Corporation, JER1002 (No. 1002 type), softening point: 78° C.
 Epoxy resin 2: bisphenol A-type epoxy resin, manufactured by Mitsubishi Chemical Corporation, JER1003F (No. 1003 type), softening point: 89° C.
 Epoxy resin 3: biphenyl aralkyl-type epoxy resin, manufactured by Nippon Kayaku Co., Ltd., NC-3000, softening point: 53° C. to 63° C.
 Epoxy resin 4: orthocresol novolac-type epoxy resin, manufactured by Nippon Kayaku Co., Ltd., 102
(Inorganic Filler)
 Inorganic filler 1: calcium carbonate, manufactured by MARUO CALCIUM Co., Ltd., N-35
 Inorganic filler 2: spherical silica, manufactured by NIPPON STEEL Chemical & Material Co., Ltd., HS-208
 Inorganic filler 3: fused crushed silica, manufactured by Fumitec Co., Ltd., FMT-20
(Pigment)
 Pigment 1: titanium oxide, manufactured by ISHIHARA SANGYO KAISHA, LTD., CR-500
 Pigment 2: carbon black, manufactured by Mitsubishi Chemical Corporation, MA-600
(Leveling Material)
 Leveling material 1: acrylic oligomer, manufactured by Allnex GMBH, MODAFLOW POWDER 3
(Curing Agent)
 Curing agent 1: 3,3',4,4'-benzophenone tetracarboxylic dianhydride (BTDA)
 Curing agent 2: biphenyl aralkyl-type phenolic resin, manufactured by MEIWA PLASTIC INDUSTRIES, LTD., MEHC-7851-H
(Curing Accelerator)
 Curing accelerator 1: 2,4-diamino-6-[2'-methylimidazoly]-(1')]-ethyl-s-triazine, manufactured by SHIKOKU CHEMICALS CORPORATION, 2MZ-A
 Curing accelerator 2: triphenylphosphine (TPP), manufactured by K·I Chemical Industry Co., LTD.
 Curing accelerator 3: 2-phenylimidazole, manufactured by SHIKOKU CHEMICALS CORPORATION, 2PZ
(Other Components)
(Fluidity Imparting Material)
 Powder fluidity imparting material 1: fine alumina, manufactured by Evonik Industries, AEROXIDE AluC, $d_{50}$=13 nm
 Powder fluidity imparting material 2: fine silica, manufactured by Evonik Industries, AEROSIL R972, $d_{50}$=16 nm (Production of Powder Coating Material)

A powder coating material of each example was obtained by preparing a thermosetting resin composition according to the formulation shown in Table 1 and mixing the obtained thermosetting resin composition with other components in a conventional manner.

Here, for the thermosetting resin composition, raw material components were mixed with a mixer, melt-kneaded at 80° C., pulverized with a pulverizer, and air-classified and sieved to obtain a thermosetting resin composition having particle size characteristics described in Table 1.

(Physical Properties of Powder Coating Material)

A flow rate, bulk specific gravity, true specific gravity, angle of repose, and angle of rupture of the powder coating material obtained in each example, and a particle size distribution of the thermosetting resin composition used to prepare the powder coating material were measured by the following methods. The measurement results are shown in Table 1.
(Flow Rate)
(Before Storage (t=0))
 0.5 g of the powder coating material obtained in each example was placed in a 10 mmø molding die, and pressure-molded at 20 kgf for 10 seconds to produce a cylindrical sample, and a diameter DO of the obtained sample was measured. Next, the sample was placed on a 70 mm×150 mm×0.8 mm SPCC plate, and allowed to stand in a hot air dryer at 150° C. for 30 minutes. A diameter D1 at a contact surface of the sample with the SPCC plate after the allowing to stand was measured.

A horizontal flow rate before storage, that is, a flow rate X(0) [%] was calculated based on the following expression (i).

$$X(t)(\%)=(D1-D0)/D0\times 100 \tag{1}$$

(After Storage (t=15))

The powder coating material in each example was stored at 40° C. for 15 days without molding. After the storage, production of a sample after the storage, measurement of DO, standing at 150° C. for 30 minutes, and measurement of D1 were performed according to the procedure for measuring the flow rate of the powder coating material before storage (t=0). A horizontal flow rate after the storage, that is, a flow rate X(15) [$] was calculated based on the above expression (i).

(Flow-Rate Change Index R)

From the obtained flow rate X(0) and the flow rate X(15), R [%] was calculated based on the following expression (ii).

$$R=X(0)-X(15) \tag{ii}$$

(Bulk Specific Gravity)

Measurement was carried out at room temperature with a powder tester TP-X(manufactured by Hosokawa Micron Group).

(True Specific Gravity)

The true specific gravity of the powder state was measured at room temperature with a dry automatic density meter AccuPyc II 1340 (manufactured by Shimadzu Corporation).

(Angle of Repose and Angle of Rupture)

Measurement was carried out at room temperature with a powder tester TP-X(manufactured by Hosokawa Micron Group).

(Particle Size Distribution of Thermosetting Resin Composition)

The particle size distribution of the particles was measured on a volume basis with a laser diffraction particle size distribution analyzer (Partica LA-950V2 manufactured by HORIBA).

(Evaluation)

Powder coating was performed by a flow immersion method using the powder coating material obtained in each example, and gloss of the surface of the coating film, the maximum void diameter in the cross section of the coating film, an adhesion amount during coating, and shear tensile strength at the superposition of the copper plate were measured.

For the powder coating material of each example, the evaluations were performed immediately after production and after storage at 40° C. for 15 days. The evaluation results are shown in Table 1.

(Surface Gloss)

The surface gloss was measured as an index of smoothness of the coating film. After heating a copper plate (material C1100: 15 mm×100 mm×1 mm) at 190° C. for 10 minutes, the copper plate was immersed twice for 1 second at a depth of 20 mm in a fluidized immersion chamber in which the powder coating material flowed. After heating at 190° C. for 20 minutes, the surface gloss was measured with a gloss meter PG-IM (manufactured by NIPPON DENSHOKU INDUSTRIES Co., LTD.). The measured values at an angle of 60° were compared.

(Maximum Void Diameter)

After heating a copper plate (material C1100: 15 mm×100 mm×1 mm) at 190° C. for 10 minutes, the copper plate was immersed twice for 5 seconds at a depth of 20 mm in a fluidized immersion chamber in which the powder coating material flowed, thereby forming a coating film. After heating at 190° C. for 20 minutes, a portion of 10 mm from the tip was polished, and voids in the cross section of the coating film were observed with a microscope (VHX-5000: manufactured by KEYENCE CORPORATION).

(Adhesion Amount During Coating)

After heating a copper plate (material C1100: 15 mm×100 mm×1 mm) at 190° C. for 10 minutes, the copper plate was immersed twice for 1 second at a depth of 20 mm in a fluidized immersion chamber in which the powder coating material flowed. After heating at 190° C. for 20 minutes, a portion of 10 mm from the tip was polished, and a thickness of the coating film was observed with a microscope (VHX-5000: manufactured by KEYENCE CORPORATION).

In Table 1, "Dripping" is a phenomenon in which the coating film drops due to low melt viscosity, "Not flowing" is a phenomenon in which the powder aggregates and blows out from the fluidized chamber, and "Not floating" is a phenomenon in which the powder is not lifted by air introduced into the fluidized chamber.

(Shear Tensile Strength)

Two copper plates (material C1100: width 15 mm×length 100 mm×thickness 1 mm) were superimposed and shifted in opposite directions in a length direction, so that the overlapping portion of the two plates was 10 mm in the length direction. That is, the overlapping region of the two plates is a region of width 15 mm×length 10 mm. 0.1 g of melted powder coating material was applied between the two copper plates in the overlapping region to bond them together, followed by heating at 190° C. for 20 minutes to obtain a test piece.

Both ends of the above-described test piece, that is, the end of each copper plate on the side opposite to the overlapping region was sandwiched between autographs (manufactured by Shimadzu Corporation) and pulled at 10 mm/min until breakage to perform a shear tensile measurement.

TABLE 1-1

| | | | Example 1 | Example 2 | Example 3 | Example 4 | Example 5 | Example 6 |
|---|---|---|---|---|---|---|---|---|
| Formulation (part by mass) | Thermosetting resin composition | Epoxy resin 1 | 36.5 | 17.3 | 17.3 | 17.3 | 17.3 | |
| | | Epoxy resin 2 | | 17.3 | 17.3 | 17.3 | 17.3 | |
| | | Epoxy resin 3 | | | | | | 23 |
| | | Epoxy resin 4 | | | | | | |
| | | Inorganic filler 1 | 14.1 | | 59.6 | | | |

TABLE 1-1-continued

|  |  | Example 1 | Example 2 | Example 3 | Example 4 | Example 5 | Example 6 |
|---|---|---|---|---|---|---|---|
|  | Inorganic filler 2 | 42.4 | 59.6 |  |  | 59.6 | 60 |
|  | Inorganic filler 3 |  |  |  | 59.6 |  |  |
|  | Pigment 1 | 0.34 | 0.36 | 0.36 | 0.36 | 0.36 | 0.36 |
|  | Pigment 2 | 0.02 | 0.02 | 0.02 | 0.02 | 0.02 | 0.02 |
|  | Leveling material 1 | 0.19 | 0.2 | 0.2 | 0.2 | 0.2 | 0.2 |
|  | Curing agent 1 | 6.38 | 5.2 | 5.2 | 5.2 | 5.2 |  |
|  | Curing agent 2 |  |  |  |  |  | 17 |
|  | Curing accelerator 1 |  |  |  |  |  |  |
|  | Curing accelerator 2 | 0.04 | 0.04 | 0.04 | 0.04 | 0.04 | 0.1 |
|  | Curing accelerator 3 |  |  |  |  |  |  |
|  | Total | 99.97 | 100.02 | 100.02 | 100.02 | 100.02 | 100.68 |
| Other components | Fluidity imparting material 1 | 0.15 | 0.25 | 0.25 | 0.25 |  | 0.25 |
|  | Fluidity imparting material 2 |  |  |  |  | 0.25 |  |

TABLE 1-2

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Formulation (part by mass) | Thermosetting resin composition | Epoxy resin 1 | 17.3 |  | 17.3 | 17.3 | 17.3 | 17.3 |
|  |  | Epoxy resin 2 | 17.3 | 37.3 | 17.3 | 17.3 | 17.3 | 17.3 |
|  |  | Epoxy resin 3 |  |  |  |  |  |  |
|  |  | Epoxy resin 4 |  | 4.1 |  |  |  |  |
|  |  | Inorganic filler 1 | 59.6 |  |  |  |  |  |
|  |  | Inorganic filler 2 |  | 53 | 59.6 | 59.6 | 59.6 | 59.6 |
|  |  | Inorganic filler 3 |  |  |  |  |  |  |
|  |  | Pigment 1 | 0.36 | 0.36 | 0.36 | 0.36 | 0.36 | 0.36 |
|  |  | Pigment 2 | 0.02 | 0.02 | 0.02 | 0.02 | 0.02 | 0.02 |
|  |  | Leveling material 1 | 0.2 | 0.2 | 0.2 | 0.2 | 0.2 | 0.2 |
|  |  | Curing agent 1 | 3.5 | 3.5 | 5.2 | 5.2 | 5.2 | 5.2 |
|  |  | Curing agent 2 |  |  |  |  |  |  |
|  |  | Curing accelerator 1 |  | 1.86 |  |  |  |  |
|  |  | Curing accelerator 2 |  |  | 4 | 0.001 | 0.04 | 0.04 |
|  |  | Curing accelerator 3 | 0.04 |  |  |  |  |  |
|  |  | Total | 98.32 | 100.34 | 103.98 | 99.981 | 100.02 | 100.02 |
|  | Other components | Fluidity imparting material 1 | 0.25 | 0.25 | 0.25 | 0.25 | 0.25 | 0.25 |
|  |  | Fluidity imparting material 2 |  |  |  |  |  |  |

TABLE 1-3

|  | Evaluation item |  | Example 1 | Example 2 | Example 3 | Example 4 | Example 5 | Example 6 |
|---|---|---|---|---|---|---|---|---|
| Initial physical properties | Flow rate X(0) | [%] | 48 | 41 | 35 | 36 | 38 | 35 |
|  | $d_{10}$ of thermosetting resin composition | [μm] | 31 | 31 | 30 | 30 | 31 | 30 |
|  | $d_{90}$ of thermosetting resin composition | [μm] | 125 | 132 | 130 | 129 | 132 | 130 |
|  | Bulk specific gravity | [g/cm$^{-3}$] | 0.76 | 0.78 | 0.79 | 0.78 | 0.78 | 0.75 |
|  | True specific gravity | [g/cm$^{-3}$] | 1.75 | 1.8 | 1.9 | 1.8 | 1.8 | 1.7 |
|  | Bulk specific gravity/true specific gravity |  | 0.43 | 0.43 | 0.42 | 0.43 | 0.43 | 0.44 |
|  | Angle of repose | [°] | 34 | 33 | 35 | 34 | 33 | 33 |
|  | Angle of rupture | [°] | 15 | 14 | 15 | 15 | 14 | 14 |
|  | Surface gloss |  | 63 | 60 | 58 | 58 | 58 | 57 |
|  | Maximum void diameter | μm | 140 | 150 | 160 | 150 | 140 | 150 |
|  | Adhesion amount during coating | μm | 400 | 500 | 500 | 500 | 500 | 500 |
|  | Shear tensile strength | MPa | 15 | 15 | 14 | 15 | 14 | 12 |
| Physical properties after storage | Flow rate X(15) | [%] | 23 | 22 | 15 | 15 | 20 | 15 |
|  | Flow-rate change index R | [%] | 25 | 19 | 20 | 21 | 18 | 20 |
|  | Surface gloss |  | 53 | 51 | 51 | 51 | 50 | 52 |
|  | Maximum void diameter | μm | 160 | 160 | 170 | 170 | 160 | 170 |
|  | Adhesion amount during coating | μm | 380 | 490 | 480 | 480 | 490 | 480 |
|  | Shear tensile strength | Mpa | 13 | 12 | 11 | 12 | 13 | 11 |

TABLE 1-4

|  | Evaluation item |  | Comparative Example 1 | Comparative Example 2 | Comparative Example 3 | Comparative Example 4 | Comparative Example 5 | Comparative Example 6 |
|---|---|---|---|---|---|---|---|---|
| Initial physical properties | Flow rate X(0) | [%] | 30 | 42 | 10 | 70 | 32 | 27 |
|  | $d_{10}$ of thermosetting resin composition | [μm] | 31 | 31 | 31 | 31 | 4 | 60 |
|  | $d_{90}$ of thermosetting resin composition | [μm] | 132 | 132 | 132 | 132 | 50 | 250 |
|  | Bulk specific gravity | [g/cm$^{-3}$] | 0.78 | 0.78 | 0.78 | 0 78 | 0.55 | 0.85 |
|  | True specific gravity | [g/cm$^{-3}$] | 1.8 | 1.8 | 1.8 | 1.8 | 1.6 | 1.9 |
|  | Bulk specific gravity/true specific gravity |  | 0.43 | 0.43 | 0.43 | 0.43 | 0.34 | 0.45 |
|  | Angle of repose | [°] | 33 | 33 | 33 | 33 | 52 | 31 |
|  | Angle of rupture | [°] | 14 | 14 | 14 | 14 | 24 | 12 |
|  | Surface gloss |  | 55 | 58 | 45 | 65 | 55 | 52 |
|  | Maximum void diameter | μm | 190 | 150 | 220 | 100 | 150 | 140 |
|  | Adhesion amount during | μm | 500 | 400 | 400 | Dripping | Not flowing | Not floating |

TABLE 1-4-continued

|  |  |  | Comparative Example 1 | Comparative Example 2 | Comparative Example 3 | Comparative Example 4 | Comparative Example 5 | Comparative Example 6 |
|---|---|---|---|---|---|---|---|---|
|  | coating Shear tensile strength | MPa | 13 | 13 | 11 | 9 | 13 | 13 |
| Physical properties after storage | Flow rate X(15) | [%] | 3 | 5 | 0 | 50 | 13 | 10 |
|  | Flow-rate change index R | [%] | 27 | 37 | 10 | 20 | 19 | 17 |
|  | Surface gloss |  | 53 | 55 | 40 | 52 | 50 | 48 |
|  | Maximum void diameter | μm | 230 | 230 | 240 | 150 | 190 | 200 |
|  | Adhesion amount during coating | μm | 410 | 330 | 300 | 480 | Not flowing | Not floating |
|  | Shear tensile strength | Mpa | 10 | 9 | 10 | 8 | 10 | 11 |

From Table 1, both before and after the storage, the powder coating material obtained in each example had an excellent balance between the effects of preferred surface gloss, suppression of voids, stable coating adhesion during coating, and adhesive strength of copper plates. The powder coating material in each example had excellent storage stability, and could be preferably used to coat the exposed portion of the coil end.

Priority is claimed on Japanese Patent Application No. 2020-130536, filed Jul. 31, 2020, the disclosure of which is incorporated herein by reference.

REFERENCE SIGNS LIST 100 stator
101 stator core
103 stator coil
105 coil end
107 enamel-coated portion
109 exposed portion
111 coated portion

The invention claimed is:

1. A powder coating material comprising:
a particulate thermosetting resin composition comprising an epoxy resin, a curing agent, and an inorganic filler; and
inorganic particles other than the inorganic filler,
wherein an average particle diameter $d_{50}$ of the inorganic particles, which is measured by a laser diffraction method, is equal to or more than 1 nm and equal to or less than 100 nm,
wherein a content of the inorganic particles in the powder coating material is equal to or more than 0.01% by mass and equal to or less than 3.0% by mass with respect to the entire powder coating material,
wherein a particle diameter $d_{90}$ of the thermosetting resin composition, which is measured by a laser diffraction method, is equal to or more than 55 μm and equal to or less than 200 μm,
wherein a flow-rate change index R of the powder coating material, which is calculated by the following expression (ii), is equal to or more than 0% and equal to or less than 26%, $$R = X(0) - X(15) \quad (ii),$$

wherein in the expression (ii), the X(0) is a flow rate measured before storage of the powder coating material, and the X(15) is a flow rate measured after the storage of the power coating material at 40° C. for 15 days,
wherein the X(0) is equal to or more than 15% and equal to or less than 60%,
wherein the X(0) and the X(15) are measured by following procedures (1) to (4),
(1) 0.5 g of the powder coating material is placed in a 10 mmo molding die, and pressure-molded at 20 kgf for 10 seconds to produce a cylindrical sample to measure a diameter D0 of the cylindrical sample,
(2) after measuring the diameter D0, the cylindrical sample is placed on a 70 mm×150 mm×0.8 mm SPCC plate, and allowed to stand in a hot air dryer at 150° C. for 30 minutes,
(3) a diameter D1 at a contact surface of the cylindrical sample with the SPCC plate after the allowing to stand is measured, and
(4) D0 and D1 described above are measured before the storage (t=0 days) and after the storage at 40° C. for 15 days (t=15 days), and each of the X(0) and the X(15) is calculated based on the following expression (i).

$$X(t)(\%) = (D1 - D0)/D0 \times 100 \quad (i),$$

2. The powder coating material according to claim 1, wherein the flow rate X(15) of the powder coating material after the storage for 15 days is equal to or more than 15% and equal to or less than 60%.

3. The powder coating material according to claim 1, wherein the epoxy resin includes one kind or two or more kinds selected from the group consisting of a bisphenol A-type epoxy resin, a bisphenol F-type epoxy resin, a novolac-type epoxy resin, a phenol novolac-type epoxy resin, a biphenyl-type epoxy resin, a naphthalene-type epoxy resin, and a biphenyl aralkyl-type epoxy resin.

4. The powder coating material according to claim 1, wherein the curing agent includes one or more kinds selected from the group consisting of an acid anhydride and a phenolic resin.

5. The powder coating material according to claim 1, wherein a particle diameter $d_{10}$ of the thermosetting resin composition, which is measured by the laser diffraction method, is equal to or more than 5 μm and equal to or less than 50 μm.

6. The powder coating material according to claim 1, wherein a ratio (bulk specific gravity/true specific gravity) of a bulk specific gravity of the powder coating material to a true specific gravity of the powder coating material is equal to or more than 0.3 and equal to or less than 0.75.

7. The powder coating material according to claim 1, wherein an angle of repose of the powder coating material is equal to or more than 25° and equal to or less than 45°.

8. The powder coating material according to claim 1, wherein an angle of rupture of the powder coating material is equal to or more than 10° and equal to or less than 25°.

9. The powder coating material according to claim 1, wherein the powder coating material is used for a powder coating method comprising:
providing a coil comprising a coil end comprising a conductor portion coated with an insulating coating, and an exposed portion where the conductor portion is exposed from the insulating coating;
immersing the coil end in a fluidized chamber in which a powder coating material flows; and
adhering a melt of the powder coating material to the exposed portion.

10. A coil comprising:
the coil end in which the exposed portion is sealed with the powder coating material according to claim 1.

11. A method for sealing a coil end, comprising:
a step of immersing a coil end of a coil, which includes a conductor portion coated with an insulating coating and an exposed portion where the conductor portion is exposed from the insulating coating, in a fluidized chamber in which a powder coating material flows, and adhering a melt of the powder coating material to an outside of the exposed portion,
wherein the powder coating material is the powder coating material according to claim 1.

12. The powder coating material according to claim 9, wherein the powder coating material is used in the powder coating method for adhering the melt from the exposed portion of the coil end over the insulating coating, in the step of adhering the melt of the powder coating material to the outside of the exposed portion.

\* \* \* \* \*